(12) United States Patent
Shen et al.

(10) Patent No.: US 8,566,584 B2
(45) Date of Patent: Oct. 22, 2013

(54) METHOD, APPARATUS, AND SYSTEM FOR PROCESSING DYNAMIC HOST CONFIGURATION PROTOCOL MESSAGE

(75) Inventors: Shuo Shen, Shenzhen (CN); Sheng Jiang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 290 days.

(21) Appl. No.: 12/956,292

(22) Filed: Nov. 30, 2010

(65) Prior Publication Data

US 2011/0099370 A1   Apr. 28, 2011

Related U.S. Application Data

(63) Continuation of application No. PCT/CN2009/070892, filed on Mar. 19, 2009.

(30) Foreign Application Priority Data

May 30, 2008   (CN) .......................... 2008 1 0067553

(51) Int. Cl.
*H04L 29/06*   (2006.01)

(52) U.S. Cl.
USPC ....................................................... 713/162

(58) Field of Classification Search
USPC ....................................................... 713/162
See application file for complete search history.

(56) References Cited

U.S. PATENT DOCUMENTS

| | | | |
|---|---|---|---|
| 7,613,748 B2 * | 11/2009 | Brockway et al. | ............ 1/1 |
| 2004/0193875 A1 | 9/2004 | Aura | |
| 2005/0273866 A1 * | 12/2005 | Brown et al. | ............ 726/28 |
| 2006/0077908 A1 | 4/2006 | Park et al. | |
| 2006/0104243 A1 | 5/2006 | Park et al. | |
| 2006/0248230 A1 * | 11/2006 | Kempf et al. | ............ 709/245 |

FOREIGN PATENT DOCUMENTS

| | | |
|---|---|---|
| CN | 1452090 | 10/2003 |
| CN | 101162999 | 4/2008 |
| CN | 101162999 A | 4/2008 |
| CN | 101594230 | 6/2012 |
| GB | 2367986 | 4/2002 |

OTHER PUBLICATIONS

European Office Action issued Sep. 7, 2012 in corresponding European Patent Application No. 09753439.0.
Chinese Office Action dated Oct. 17, 2011 issued in corresponding Chinese Patent Application No. 200810067553.3.

(Continued)

*Primary Examiner* — Lisa Lewis
(74) *Attorney, Agent, or Firm* — Huawei Technologies Co., Ltd (57) ABSTRACT

A method, apparatus, and system for processing a Dynamic Host Configuration Protocol (DHCP) message are disclosed. The method includes: receiving a DHCP message, where the source address of the DHCP message is a Cryptographically Generated Address (CGA) and a signature of a DHCP message sender is carried in the DHCP message; verifying the CGA and the signature; and processing a payload of the DHCP message after the verification of the CGA and the signature succeeds. The CGA and the signature are verified in the embodiment of the present invention, thus improving the security of DHCPv6, and bringing convenience for key management due to publicity of the public key. In addition, because the life of the public key is long, configuration on the DHCP server and/or the network client is convenient.

10 Claims, 5 Drawing Sheets

FIG. 1

(56) References Cited

OTHER PUBLICATIONS

Chinese Search Report dated Aug. 17, 2011 issued in corresponding Chinese Patent Application No. 200810067553.3.
Sheng Jiang et al., "Requirements for configuring Cryptographically Generated Addresses (CGA) and overview on RA and DHCPv6-based approaches", Network Working Group Internet Draft, Jan. 2007, pp. 1-14.
Droms, R. et al., *Dynamic Host Configuration Protocol for IPv6 (DHCPv6)*, Network Working Group, Standards Track, Jul. 2003, pp. 1-101.
Arkko, J. et al., *SEcure Neighbor Discovery (SEND)*, Network Working Group, Standards Track, Mar. 2005, pp. 1-56.
Jiang, S. et al., *Secure DHCPv6 Using CGAs*, Network Working Group, Standards Track, Jan. 8, 2009, pp. 1-14.
Written Opinion of the International Searching Authority, in corresponding International Application No. PCT/CN2009/070892.
Extended European Search Report, mailed Mar. 23, 2011, in corresponding European Application No. 09753439.0.
Postel, J., *User Datagram Protocol*, RFC 768, ISI, Aug. 28, 1980, pp. 1-3.
Krawczyk, H. et al., *HMAC: Keyed-Hashing for Message Authentication*, RFC2104, IBM, Feb. 1997, pp. 1-10.
Droms, R. et al., *Dynamic Host Configuration Protocol for IPv6 (DHCPv6)*, RFC3315, Sun Microsystems, Jul. 2003, pp. 1-90.
Aura, T., *Cryptographically Generated Addresses (CGA)*, RFC3972, Microsoft Research, Mar. 2005, pp. 1-20.
International Search Report, mailed Jun. 25, 2009, in corresponding International Application No. PCT/CN2009/070892.

\* cited by examiner

METHOD, APPARATUS, AND SYSTEM FOR PROCESSING DYNAMIC HOST CONFIGURATION PROTOCOL MESSAGE

CROSS-REFERENCE TO RELATED APPLICATIONS

This application is a continuation of International Application No. PCT/CN2009/070892, filed on Mar. 19, 2009, which claims priority to Chinese Patent Application No. 200810067553.3, filed on May 30, 2008, both of which are hereby incorporated by reference in their entireties.

FIELD OF THE INVENTION

The present invention relates to a communication technology, and in particular, to a method, apparatus, and system for processing a Dynamic Host Configuration Protocol (DHCP) message.

BACKGROUND OF THE INVENTION

DHCP is a protocol of the Transmission Control Protocol/Internet Protocol (TCP/IP) suite, and is designed by the Internet Engineering Task Force (IETF) for implementing the automatic configuration of a network client. DHCP includes DHCPv4 and DHCPv6 from the perspective of IP versions. This application relates to DHCPv6. DHCPv6 includes 13 message types: SOLICIT, ADVERTISE, REQUEST, CONFIRM, RENEW, REBIND, REPLY, RELEASE, DECLINE, RECONFIGURE, INFORMATION-REQUEST, RELAY-FORWARD, and RELAY-REPLY. For ease of description, all the foregoing messages are collectively called DHCP messages. An interaction process, in which the automatic configuration of the network client is implemented through the DHCP messages communicated between a DHCP server and the network client, is described in DHCPv6. For example, an IP address, a Domain Name System (DNS) server address, and other additional configuration information are automatically assigned to the network client through the DHCP messages communicated between the DHCP server and the network client.

The DHCP server and the network client usually communicate with each other in two modes: two-message mode and four-message mode. In two-message mode, the DHCP server does not need to assign an IP address to the network client. Specifically, the network client first sends a REQUEST message to the link-local multicast address, requesting configuration information; the DHCP server receives the message, and sends a REPLY message carrying the requested configuration information to the network client. In four-message mode, the DHCP server needs to assign an IP address to the network client. Specifically, the network client sends a SOLICIT message to the local link multicast address to discover valid DHCP servers; all the DHCP servers meeting the requirement of the network client return an ADVERTISE message, indicating the DHCP server can provide addresse and configuration information; the network client selects a DHCP server from the DHCP servers that return the ADVERTISE message, and sends a REQUEST message to the selected DHCP server, requesting the selected DHCP server to assign an IP address and/or configuration information; the DHCP server that receives the REQUEST message sends a REPLY message carrying the requested IP address and/or configuration information to the network client.

In the foregoing solution, the DHCP message is initiated by the network client. In actual application scenarios, the DHCP server may also initiate a DHCP message, for example, initiate a RECONFIGURE message to the network client, thus triggering the network client to update the previous configuration.

During the research on DHCPv6, the inventor discovers the following problems: Because both the unicast address used by the network client and the unicast address used by the DHCP server are spoofed easily, the security mechanism of the DHCP message cannot be ensured. For example, after the unicast address used by the DHCP server is spoofed, an attacker will perform malicious configuration on the network client.

SUMMARY OF THE INVENTION

Embodiments of the present invention provide a method, apparatus, and system for processing a DHCP message to verify the address of the DHCP message sender, thus improving the security of the DHCP message.

The purpose of embodiments of the invention is realized through the following technical solution:

A method for processing a DHCP message includes: receiving a DHCP message, where a source address of the DHCP message is a Cryptographically Generated Address (CGA) and a signature of a DHCP message sender is carried in the DHCP message; verifying the CGA and the signature; and processing a payload of the DHCP message after the verification of the CGA and the signature succeeds.

A method for sending a DHCP message includes: signing a DHCP message according to a private key of a DHCP message sender and generating a second DHCP message carrying a signature, where a source address of the second DHCP message is a CGA; and sending the second DHCP message.

An apparatus for processing a DHCP message includes: a receiving module 1101, configured to receive a DHCP message, where a source address of the DHCP message is a CGA of a DHCP message sender and a signature of the DHCP message sender is carried in the DHCP message; an address verifying module 1102, configured to verify the CGA; a signature verifying module 1103, configured to verify the signature; and a payload processing module 1104, configured to process a payload of the DHCP message after the verification of the CGA and the signature succeeds.

An apparatus for sending a DHCP message includes: a signing unit 1002, configured to sign a DHCP message according to a private key of a DHCP message sender and generate a second DHCP message carrying a signature, where a source address of the second DHCP message is a CGA; and a sending unit 1003, configured to send the second DHCP message.

A system for processing a DHCP message includes a DHCP server configured to communicate a DHCP message with a network client. Specifically, when the DHCP server receives a message sent from the network client, the DHCP server is configured to:

receive a DHCP message from the network client, where a source address of the DHCP message is a CGA and a signature of the network client is carried in the DHCP message; verify the CGA and the signature; and process a payload of the DHCP message after the verification of the CGA and the signature succeeds;
    and/or
    when the DHCP server sends a DHCP message to the network client, the DHCP server is configured to:
    sign the DHCP message according to a private key of the DHCP server, and generating a second DHCP message carrying a signature, where a source address of the second DHCP message is a CGA; and send the second DHCP message.

A system for processing a DHCP message includes a network client configured to exchange a DHCP message with a DHCP server. Specifically, when the network client receives a message from the DHCP server, the network client is configured to:

receive a DHCP message from the DHCP server, where a source address of the DHCP message is a CGA and a signature of the DHCP server is carried in the DHCP message; verify the CGA and the signature; and process a payload of the DHCP message after the verification of the CGA and the signature data succeeds;

and/or when the network client sends a message to the DHCP server, the network client is configured to:

sign a DHCP message according to a private key of the network client, and generate a second DHCP message carrying a signature, where a source address of the second DHCP message is a CGA; and send the second DHCP message.

The CGA and the signature are verified in the embodiments of the present invention, thus improving the security of DHCPv6, and bringing convenience for key management due to publicity of the public key. In addition, because the life of the public key is long, configuration on the DHCP server and/or the network client is convenient.

DETAILED DESCRIPTION OF THE EMBODIMENTS

Embodiments of the present invention introduce the verification of the CGA to the DHCP message. The DHCP message receiver can verify the address of the DHCP message sender, thus improving the security of the DHCP message communicated between the DHCP message receiver and the DHCP message sender.

The verification of the CGA can be used to confirm whether a message sender in the network communication is the owner of the source address of the message. The CGA is owned by the message sender, and is a special IPv6 address, which includes a prefix and an interface identifier. The interface identifier of the IPv6 address is calculated by using a chaotic algorithm based on a public key and CGA parameters of the CGA owner. In this way, a binding relation is established between the public key and the CGA. The receiver calculates a value by using the chaotic algorithm based on the public key and CGA parameters of the CGA owner and compares the value with the CGA; if they are consistent, the receiver can verify that the sender of the CGA is the owner of the CGA. RFC 3972 of the IETF defines generation of the CGA.

To make the technical solution and merits of the present invention clearer, the following describes the present invention in detail with reference to accompanying drawings and exemplary embodiments.

Embodiment 1

Figure 1:
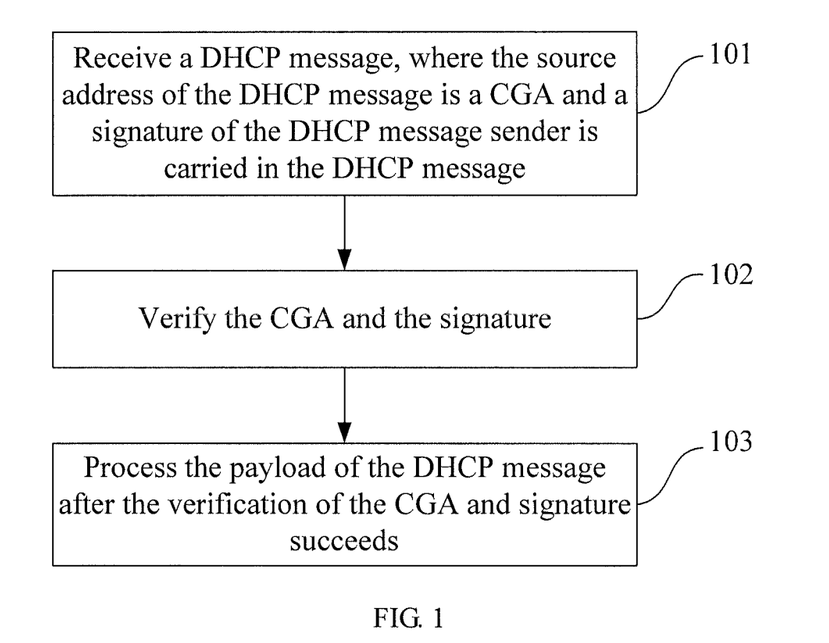
FIG. 1 is a flowchart of a method for processing a DHCP message in embodiment 1 of the present invention.

FIG. 1 is a flowchart of a method for processing a DHCP message in the first embodiment of the present invention. The method includes:

Block 101: Receive a DHCP Message, where the source address of the DHCP message is a CGA and a signature of the DHCP message sender is carried in the DHCP message.

In the implementation of the embodiment of the present invention, the source address of the DHCP message sender is a CGA; when the CGA is generated, the DHCP message sender deploys a private key and a public key of the sender beforehand. The public key and the private key are in a one-to-one mapping relation. The CGA is a special IPv6 address and includes a subnet prefix and an interface identifier. The DHCP message sender calculates the interface identifier of the CGA by using the chaotic algorithm based on the public key and CGA parameters of the sender. The DHCP message sender signs the DHCP message with the private key. Generally, to ensure integrity and authenticity of the DHCP message, signing all contents of the DHCP message is recommended. Examples of the information that may be signed are: DHCP message header, source address and destination address in the IP packet header, and DHCP message payload. Then the DHCP message carrying the signature is sent to the DHCP message receiver. The method for generating the signature is described in RFC 3927 of the IETF, and is not further described.

In the implementation of the embodiment of the present invention, the DHCPv6 protocol may be extended. For example, the public key and/or CGA parameters of the DHCP message sender may be obtained from a third-party authority; or the public key and/or CGA parameters of the DHCP message sender may be obtained according to other information except the DHCP message, where the other information is communicated between the DHCP sender and the DHCP receiver beforehand; or the public key and/or CGA parameters of the DHCP message sender may be obtained according to the received DHCP message. The DHCP message receiver may obtain the public key and the CGA parameters in many ways; therefore, the DHCPv6 protocol can also be extended in many ways. When the DHCP message receiver obtains the public key and CGA parameters of the DHCP message sender from the third-party authority or according to the other information, the signature may be carried in the DHCP message; when the DHCP message receiver obtains the public key of the DHCP message sender from the third-party authority or according to the other information, the signature and the CGA parameters may be carried in the DHCP message; when the DHCP message receiver obtains the CGA parameters of the DHCP message sender from the third-party authority or according to the other information, the signature and the public key of the DHCP message sender may be carried in the DHCP message. The following describes different extension methods respectively.

Figure 2:
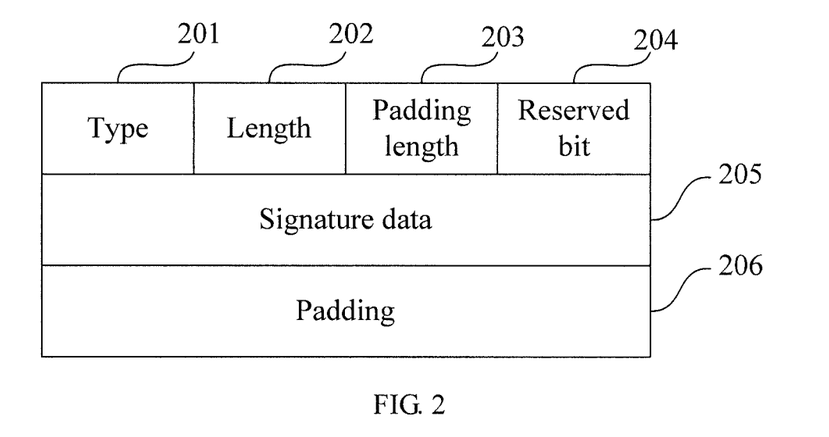
FIG. 2 is an example of adding a signature option to a DHCP message in the embodiment 1 of the present invention.

Example 1 of extending the DHCP protocol is that a signature option is added to the DHCP message, where the format of the signature option is not limited in the embodiment of the present invention. To make the embodiment of the present invention clearer, FIG. 2 is taken as an example. FIG. 2 is an example of adding a signature option to a DHCP message in the embodiment 1 of the present invention. In FIG. 2, type 201 indicates the type of the option, e.g. the signature option; length 202 indicates the length of the signature option; padding length 203 indicates the length of the padding in the signature option, and the meaning of the padding is explained hereinafter; reserved bit 204 is set for possible future use; signature data 205 indicates the signature of the DHCP message sender for the DHCP message; and padding 206 indicates the byte padded for the purpose of security or other consideration, and generally, the byte is meaningless. The signature is carried in the signature option of the DHCP message. In this way, the DHCP message receiver obtains the public key and CGA parameters of the DHCP message sender from a third-party authority or according to the other information.

Figure 3:
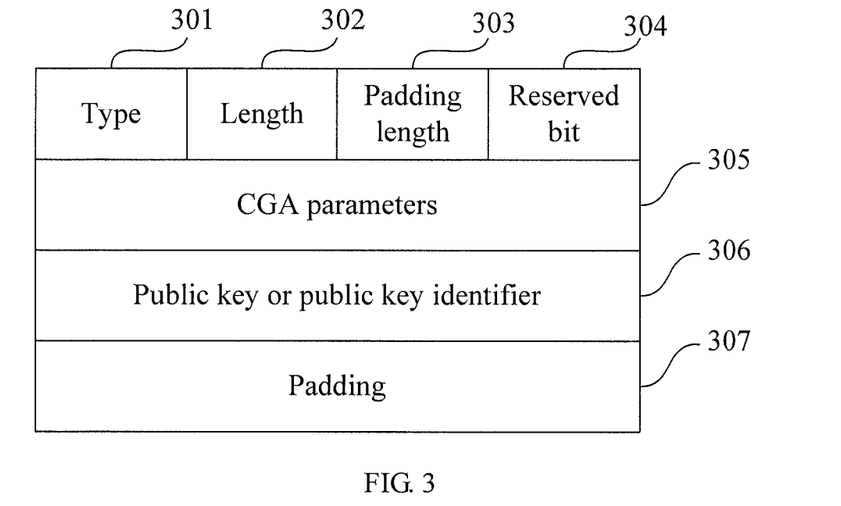
FIG. 3 is an example of adding a CGA parameter option to a DHCP message in the embodiment 1 of the present invention.

Example 2 of extending the DHCP protocol is that a CGA parameter option and a signature option are added to the DHCP message, where the CGA parameter 305 is a union of the parameters used in the process for generating the CGA. The parameters are described in the RFC 3972. The format of the CGA parameter option is not limited in the embodiment of the present invention. FIG. 3 is an example of adding a CGA parameter option to a DHCP message in the embodiment 1 of the present invention. In FIG. 3, type 301 indicates the type of the option, e.g. the CGA parameter option; length 302 indicates the length of the CGA parameter option; padding length 303 indicates the length of padding in the CGA parameter option, and the meaning of the padding is explained hereinafter; reserved bit 304 is set for possible future use; CGA parameters 305 indicate a union of the parameters used in the process for generating the CGA; public key or public key identifier 306 indicate the public key or public key identifier (Key or Key id) of the DHCP message sender, where the public key identifier is an identifier that helps the DHCP message receiver find the public key; and padding 307 indicates the byte padded for the purpose of security or other consideration, and generally, the byte is meaningless. The CGA parameters are carried in the CGA parameter option of the DHCP message. For examples of the signature option, see FIG. 2. In this way, the DHCP message receiver obtains the CGA parameters and public key information according to the DHCP message directly. Alternatively, public key information may not be included in the CGA parameter option. In this case, the DHCP message receiver obtains the public key of the DHCP message sender from the third-party authority or according to the other information. When the DHCP message receiver obtains the public key of the DHCP message sender from the third-party authority or according to the other information, the CGA parameter option may not include public key information, thus the field of Key or Key id can be deleted or not used.

When the CGA parameter option and the signature option are carried in the DHCP message, preferably, the signature option is placed at the last position of all DHCP options. It is also recommended to sign the CGA parameters and/or public key information, which can prevent all contents of the DHCP message from being maliciously tampered.

Figure 4:
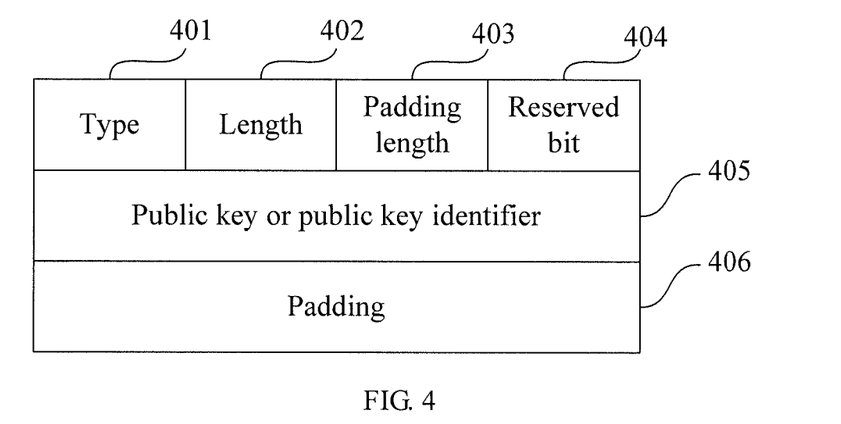
FIG. 4 is an example of adding a public key option to a DHCP message in the embodiment 1 of the present invention.

Example 3 of extending the DHCP protocol is that a public key option and a signature option are added to the DHCP message. The format of the public key option is not limited in the embodiment of the present invention. FIG. 4 is an example of adding a public key option to a DHCP message in the embodiment 1 of the present invention. In FIG. 4, type 401 indicates an option type, e.g. the public key option; length 402 indicates the length of the public key option; padding length 403 indicates the length of padding in the public key option, and the meaning of the padding is explained hereinafter; reserved bit 404 is set for possible future use; public key or public key identifier 405 indicate the public key or public key identifier of the DHCP message sender; and padding 406 indicates the byte padded for the purpose of security or other consideration, and generally, the byte is meaningless. The public key information is carried in the public key option of the DHCP message. For examples of the signature option, see FIG. 2. In this way, the DHCP message receiver obtains the public key of the DHCP message sender according to the DHCP message directly. The DHCP message receiver may obtain the CGA parameters of the DHCP message sender from a third-party authority or according to the other information.

When the public key option and the signature option are carried in the DHCP message, preferably, the signature option is placed at the last position of all DHCP options. It is also recommended to sign the public key option, which can prevent all contents of the DHCP message from being maliciously tampered.

Figure 5:
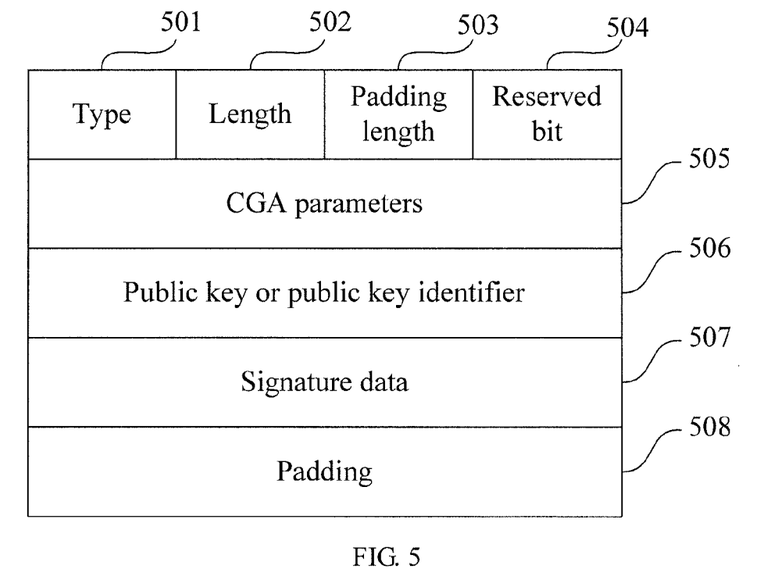
FIG. 5 is an example of adding a CGA option to a DHCP message in the embodiment 1 of the present invention.

Example 4 of extending the DHCP protocol is that a CGA option is added to the DHCP message, where CGA parameters, public key information, and signature data are carried in the CGA option. The format of the CGA option is not limited in the embodiment of the present invention. FIG. 5 is an example of adding a CGA option to a DHCP message in the embodiment 1 of the present invention. In FIG. 5, type 501 indicates an option type, e.g. the CGA option; length 502 indicates the length of the CGA option; padding length 503 indicates the length of padding in the CGA option, and the meaning of the padding is explained hereinafter; reserved bit 504 is set for possible future use; CGA parameters 505 indicate a union of the parameters used in generating the CGA; public key or public key identifier 506 indicate the public key or public key identifier (Key or Key id) of the DHCP message sender; signature data 507 indicates the signature of the DHCP message sender for the DHCP message; and padding 508 indicates the byte padded for the purpose of security or other consideration, and generally, the byte is meaningless. When public key information is not included in the DHCP message, the Key or Key id field may be deleted or not used. This can prevent all contents of the DHCP message from being maliciously tampered. The CGA parameters and the signature are carried in the CGA option of the DHCP message. In this way, the DHCP message receiver obtains the public key and CGA parameters of the DHCP message sender according to the DHCP message directly. Obtaining the CGA parameters of the DHCP message sender from a third-party authority or according to the other information may not adopted.

When CGA parameters, public key information, and signature data are included in the CGA option of the DHCP message, preferably, the signature data is placed at the last position of the CGA option, and the CGA option is placed at the last position of the DHCP message, so as to sign all contents before the signature data, which can prevent all contents of the DHCP message from being maliciously tampered.

Block 102: Verify the CGA and signature.

After obtaining the public key and CGA parameters of the DHCP message sender, the DHCP message receiver obtains a result by using a second chaotic algorithm based on the public key and CGA parameters of the DHCP message sender, and compares the obtained result with the CGA. The second chaotic algorithm may be the same as the first chaotic algorithm. In this way, when the obtained result is the same as the CGA, it indicates that the sender of the CGA is the owner of the CGA. Therefore, the verification of the CGA succeeds. When the obtained result is not the same as the CGA, it indicates that the sender of the CGA is not the owner of the CGA. Therefore, the verification of the CGA fails.

Moreover, the second chaotic algorithm may be different from the first chaotic algorithm. In this case, a mapping between the obtained result and the CGA exists. Here the mapping should be a unique mapping due to different encryption algorithms. The DHCP message sender and the DHCP message receiver may agree on the mapping beforehand so that the DHCP message receiver can identify the identity of the DHCP message sender. When the obtained result corresponds to the CGA, the DHCP message receiver is convinced that the sender of the DHCP message is the owner of the CGA. Therefore, the verification of the CGA succeeds. When the obtained result does not correspond to the CGA, the DHCP message receiver is convinced that the sender of the DHCP message is not the owner of the CGA. Therefore, the verification of the CGA fails, and the DHCP message receiver does not process the DHCP message.

Alternatively, when the verification of the CGA fails, the DHCP message receiver may also generate a log file or an alarm by using the information about the failure of the verification of the CGA.

When verifying the signature, the DHCP message receiver obtains the public key of the DHCP message sender. The public key of the DHCP message sender can be obtained in many ways, as described above. The DHCP message receiver verifies the signature by using the public key of the DHCP message sender. RFC 3972 of the IETF defines the verification scheme of the signature. When the verification of the signature fails, the DHCP message receiver does not process the DHCP message. Alternatively, the DHCP message receiver may also generate a log file or an alarm by using the information about the failure of the verification of the signature.

Block 103: Process the payload of the DHCP message after the verification of the CGA and the signature succeeds.

In the implementation of the present invention, the DHCP message receiver begins to process the payload of the DHCP message after the verification of the CGA and the signature succeeds, so as to prevent attackers from performing malicious configuration on the DHCP message sender. Therefore, the security mechanism of the DHCP message is improved effectively.

It should be noted that the sequence of verification of the CGA and verification of the signature is not limited in the embodiment of the present invention.

In the embodiment of the present invention, the DHCP message may be sent by a DHCP server or a network client. That is, the sender may be the DHCP server or the network client. When the sender is the DHCP server, the receiver is the network client; likewise, when the sender is the network client, the receiver is the DHCP server.

When the message communicated between the DHCP server and the network client needs to be forwarded by a layer-3 device, a DHCP relay server is required. In the technical solution of the embodiment of the present invention, the CGA and signature are verified on the DHCP server and/or the network client, and the DHCP relay server does not need to perform any extra operation. Therefore, the technical solution of the embodiment of the present invention is also applicable in the scenario where a DHCP relay server exists.

The CGA and the signature are verified in the embodiment of the present invention, thus improving the security of DHCPv6, and bringing convenience for key management due to publicity of the public key. Furthermore, because the life of the public key is long, configuration on the DHCP server and/or the network client is convenient.

In addition, a method for sending a DHCP message is provided in the embodiment of the present invention. The method includes: signing a DHCP message according to a private key of a DHCP message sender and generating a second DHCP message carrying a signature, where the source address of the second DHCP message is a CGA; and sending the second DHCP message.

Before signing the DHCP message according to the private key of the DHCP message sender, the method further includes: generating the CGA by using a chaotic algorithm based on the public key and CGA parameters of the DHCP message sender.

Figure 6:
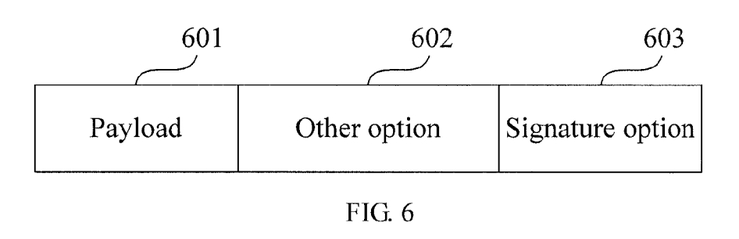
FIG. 6 is a schematic drawing of a signal sequence in the embodiment 1 of the present invention.

The embodiment 1 of the present invention provides a signal sequence for transmitting a DHCP message securely. As shown in FIG. 6, FIG. 6 is a schematic drawing of a signal sequence in the embodiment 1 of the present invention. The signal sequence is an electronic or electromagnetic data structure for transmitting the DHCP message securely. The data structure consists of one or multiple parts, which include at least the signature option. It is recommended to place the signature option 603 after the payload 601 of the DHCP message and the other option 602. For examples of the format of the signature option 603, see FIG. 2.

Figure 7:
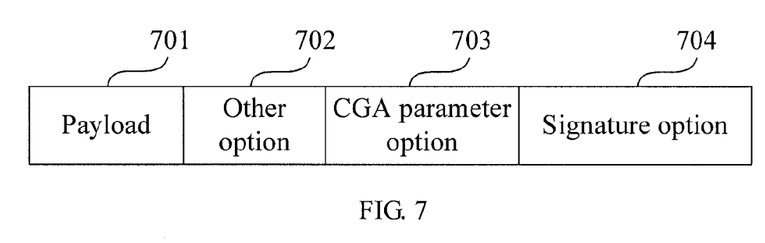
FIG. 7 is another schematic drawing of a signal sequence in the embodiment 1 of the present invention.

The embodiment 1 of the present invention provides another signal sequence for transmitting a DHCP message securely. As shown in FIG. 7, FIG. 7 is a schematic drawing of a signal sequence in the embodiment 1 of the present invention. The signal sequence is an electronic or electromagnetic data structure for transmitting the DHCP message securely. The data structure consists of one or multiple parts, which include at least the CGA parameter option 703 and the signature option 704. It is recommended to place the CGA parameter option after the payload 701 and the other option 702. It is recommended to place the signature option 704 after the CGA parameter option 703. For the examples of the format of the CGA parameter option 703, see FIG. 3; and for the examples of the format of the signature option 704, see FIG. 2.

Figure 8:
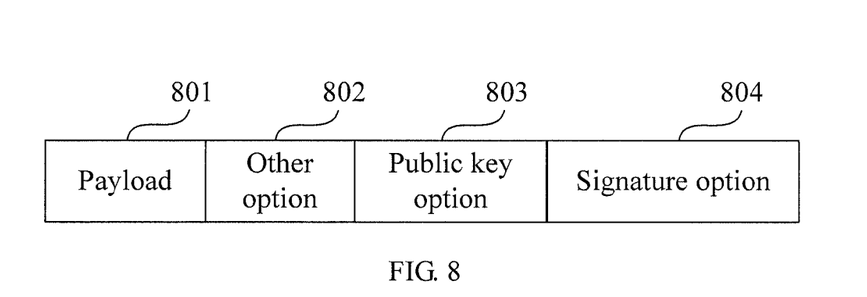
FIG. 8 is another schematic drawing of a signal sequence in the embodiment 1 of the present invention.

The embodiment 1 of the present invention provides another signal sequence for transmitting a DHCP message securely. As shown in FIG. 8, FIG. 8 is another schematic drawing of a signal sequence in the embodiment 1 of the present invention. The signal sequence is an electronic or electromagnetic data structure for transmitting the DHCP message securely. The data structure consists of one or multiple parts, which include at least the public key option 803 and the signature option 804. It is recommended to place the public key option 803 after the payload 801 and the other option 802. It is recommended to place the signature option 804 after the public key option 803. For the examples of the format of the public key option 803, see FIG. 4; and for the examples of the format of the signature option 804, see FIG. 2.

Figure 9:
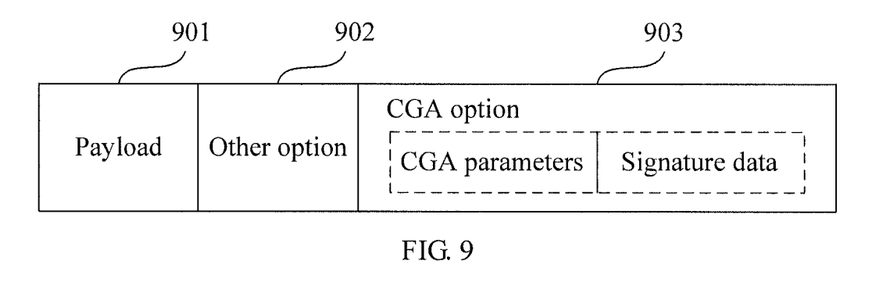
FIG. 9 is still another schematic drawing of a signal sequence in the embodiment 1 of the present invention.

The embodiment 1 of the present invention provides still another signal sequence for transmitting a DHCP message securely. As shown in FIG. 9, FIG. 9 is still another schematic drawing of a signal sequence in the embodiment 1 of the present invention. The signal sequence is an electronic or electromagnetic data structure for transmitting the DHCP message securely. The data structure consists of one or multiple parts, which include at least the CGA option 903, and the CGA option 903 consists of the CGA parameters and the signature data. It is recommended to place the CGA option 903 after the payload 901 and the other option 902. It is recommended to place the signature data after the CGA parameters. For the examples of the format of the CGA option 903, see FIG. 5.

Embodiment 2

Figure 10:
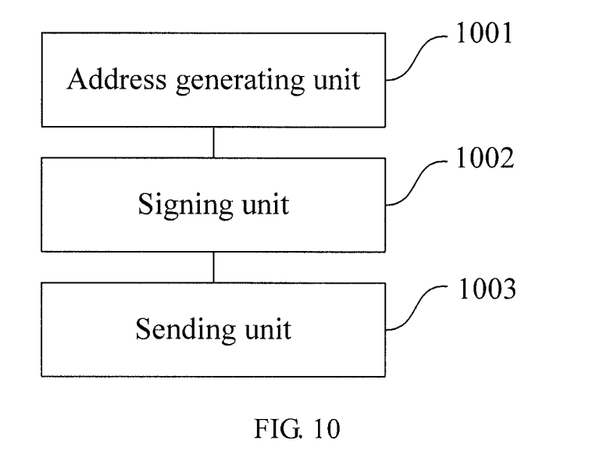
FIG. 10 is a schematic drawing of an apparatus for sending a DHCP message in embodiment 2 of the present invention.

FIG. 10 is a schematic drawing of an apparatus for sending a DHCP message in the embodiment 2 of the present invention.

The apparatus for sending a DHCP message in the embodiment 2 of the present invention includes:
- a signing unit 1002, configured to sign a DHCP message according to a private key of a DHCP message sender and generate a second DHCP message carrying a signature, where a source address of the second DHCP message is a CGA; and
- a sending unit 1003, configured to send the second DHCP message.

The apparatus for sending a DHCP message may be deployed in a DHCP server and/or a network client.

In addition, the apparatus may include an address generating unit 1001, which is configured to generate the CGA by using a chaotic algorithm based on a public key and CGA parameters of the DHCP message sender, where the CGA is the source address of the second DHCP message.

The CGA and the signature are carried in a DHCP message so that the DHCP message receiver can verify the CGA and the signature in the embodiment of the present invention, thus improving the security of DHCPv6, and bringing convenience for key management due to publicity of the public key. Furthermore, because the life of the public key is long, configuration on the DHCP server and/or the network client is convenient.

Embodiment 3

Figure 11:
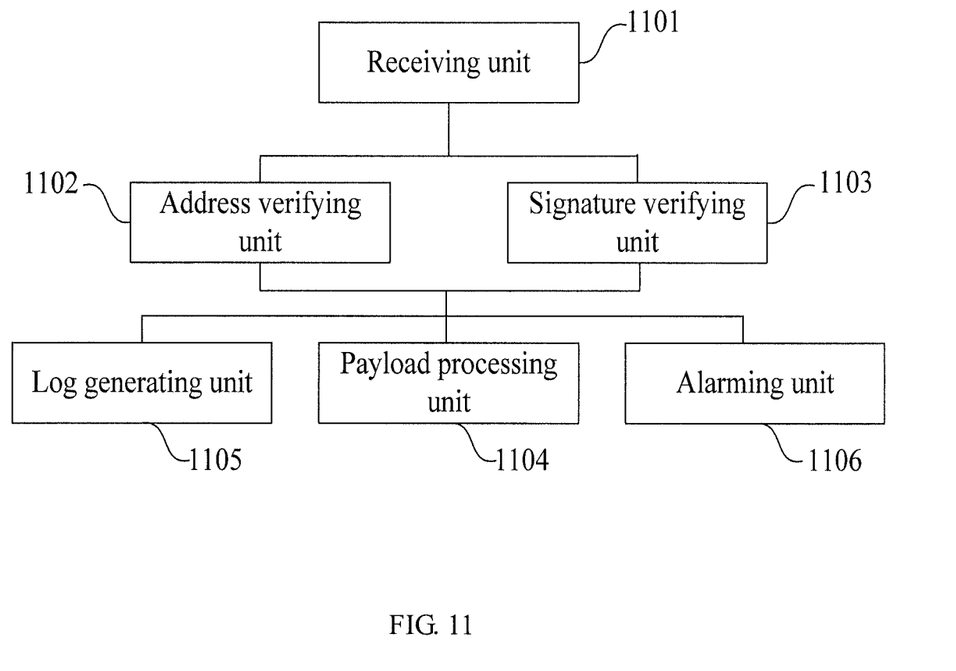
FIG. 11 is a schematic drawing of an apparatus for processing a DHCP message in embodiment 3 of the present invention.

FIG. 11 is a schematic drawing of an apparatus for processing a DHCP message in the embodiment 3 of the present invention.

The apparatus for processing a DHCP message in the embodiment 3 of the present invention includes:
- a receiving unit 1101, configured to receive a DHCP message, where the source address of the DHCP message is a CGA of the DHCP message sender and a signature of the DHCP message sender is carried in the DHCP message;
- an address verifying unit 1102, configured to verify the CGA, and specifically, verify the CGA by using a public key and CGA parameters of the DHCP message sender;
- a signature verifying unit 1103, configured to verify the signature, and specifically, verify the signature data by using the public key of the DHCP message sender; and
- a payload processing unit 1104, configured to process the payload of the DHCP message after the verification of the CGA and the signature succeeds.

In addition, the DHCP message receiver can record information about the DHCP message sender for convenience of subsequent monitoring. In this case, the apparatus further includes a log generating unit 1105, which is configured to generate a log when either of verification of the CGA and verification of the signature fails.

Moreover, to monitor the behavior of maliciously tampering addresses in real time, the apparatus includes an alarming unit 1106, which is configured to generate an alarm when either verification of the CGA or verification of the signature fails.

The apparatus for processing a DHCP message may be deployed in a DHCP server and/or a network client.

The CGA and the signature are verified in the embodiment of the present invention, thus improving the security of DHCPv6, and also bringing convenience for key management due to publicity of the public key. Furthermore, because the life of the public key is long, configuration on the DHCP server and/or the network client is convenient.

Embodiment 4

A system for processing a DHCP message is provided in the embodiment 4 of the present invention. The system includes a DHCP server, configured to communicate a DHCP message with a network client. Specifically, when the DHCP server receives a message sent from the network client, the DHCP server is configured to receive a DHCP message, where the source address of the DHCP message is a CGA and a signature of the DHCP message sender is carried in the DHCP message; verify the CGA and the signature; and process the payload of the DHCP message after the verification of the CGA and the signature succeeds;

and/or
when the DHCP server sends a message to the network client, the DHCP server is configured to sign the DHCP message according to a private key of the DHCP message sender, and generate a second DHCP message carrying a signature, where the source address of the second DHCP message is a CGA; and send the second DHCP message.

In addition, the system includes a DHCP relay server, which is configured to relay the DHCP message or the second DHCP message when the message communicated between the DHCP server and the network client needs to be forwarded by a layer-3 device.

Embodiment 5

A system for processing a DHCP message is provided in the embodiment 5. The system includes a network client, which is configured to communicate a DHCP message with a DHCP server. Specifically, when the network client receives a message sent from the DHCP server, the network client is configured to receive a DHCP message, where the source address of the DHCP message is a CGA and a signature data of the DHCP message sender is carried in the DHCP message; verify the CGA and the signature; and process the payload of the DHCP message after the verification of the CGA and the signature succeeds;

and/or
when the network client sends a message to the DHCP server, the network client is configured to sign the DHCP message according to a private key of the DHCP message sender, and generate a second DHCP message carrying a signature, where the source address of the second DHCP message is a CGA; and send the second DHCP message.

In addition, the system includes a DHCP relay server, which is configured to relay the DHCP message or the second DHCP message when the message communicated between the DHCP server and the network client needs to be forwarded by a layer-3 device.

Embodiment 6

The embodiment 6 provides a computer-readable storage medium, which includes a software code portion for adding a signature option and a software code portion for providing signature data. The signature data is the signature of the DHCP message sender for the DHCP message. The example of the signature refers to the description in embodiment 1.

Furthermore, the storage medium may include a software code portion for adding a CGA parameter option, or a software code portion for adding a public key option, or a software code portion for adding a CGA option, where the CGA option includes CGA parameters and signature data.

When the storage medium runs on a computer, the storage medium further includes a software code portion for executing the method provided in the embodiment 1.

The CGA and the signature are verified in the embodiments of the present invention, thus improving the security of DHCPv6, and bringing convenience for key management due to publicity of the public key. Furthermore, because the life of the public key is long, configuration on the DHCP server and/or the network client is convenient.

Through the descriptions of the above embodiments, those skilled in the art may understand that the present invention may be implemented by using hardware only or by using software and a necessary universal hardware platform. Based on such understandings, the technical solution of the embodiment of the present invention may be embodied in the form of a software product. The software product may be stored in a nonvolatile storage medium, which can be a Compact Disk Read-Only Memory (CD-ROM), a Universal Serial Bus (USB) flash disk, or a removable hard disk. The software product includes a number of instructions that enable a computer device (personal computer, server, or network device) to execute the methods provided in the embodiments of the present invention.

The above descriptions are merely specific embodiments of the present invention, but not intended to limit the scope of the present invention. Any modification, equivalent replacement, or improvement made without departing from the spirit and principle of the present invention should fall within the scope of the present invention.

What is claimed is:

1. A method for processing a Dynamic Host Configuration Protocol (DHCP) message, comprising:
   receiving the DHCP message, wherein a source address of the DHCP message is a Cryptographically Generated Address (CGA), and contents of the DHCP message comprise a payload, one or more CGA parameters and a signature of a DHCP message sender for the contents of the DHCP message;
   verifying the CGA and the signature of the DHCP message sender; and
   processing the payload of the DHCP message after the verifications of the CGA and the signature succeeded;
   wherein the signature of the DHCP message sender is carried in a signature option of the DHCP message and the CGA parameters are carried in a CGA parameter option of the DHCP massage, and
   wherein the CGA parameters are a union of parameters used by the DHCP message sender in a process of generating the CGA.

2. The method of claim 1, wherein the verifying the CGA and the signature of the DHCP message sender comprises:
   verifying the CGA by using a public key of the DHCP message sender and the CGA parameters; and
   verifying the signature of the DHCP message sender by using the public key of the DHCP message sender.

3. The method of claim 1, further comprising:
   generating a log when either of the verification of the CGA and the signature of the DHCP message sender fails; and/or
   generating an alarm when either of the verification of the CGA and the signature of the DHCP message sender fails.

4. The method of claim 1, wherein the DHCP message further comprises a public key option which carries public key information, wherein the public key information comprises a public key or a public key identifier.

5. A computer program product being stored on a non-transitory computer readable medium and including computer executable instructions for processing a Dynamic Host Configuration Protocol (DHCP) message, the product comprising:
   a receiving unit, configured to receive the DHCP message, wherein a source address of the DHCP message is a Cryptographically Generated Address (CGA), and contents of the DHCP message comprise a payload, one or more CGA parameters and a signature of the DHCP message sender for the contents of the DHCP message;
   an address verifying unit, configured to verify the CGA;
   a signature verifying unit, configured to verify the signature of the DHCP message sender; and
   a payload processing unit, configured to process the payload of the DHCP message after the verifications of the CGA and the signature of the DHCP message sender succeeded;
   wherein the signature of the DHCP message sender is carried in a signature option of the DHCP message and the CGA parameters are carried in a CGA parameter option of the DHCP massage, and
   wherein the CGA parameters are a union of the parameters used by the DHCP message sender in the process for generating the CGA.

6. The computer program product of claim 5, further comprising one or both of:
   a log generating unit, configured to generate a log when either of the verification of the CGA and the verification of the signature of the DHCP message sender fails; and
   an alarming unit, configured to generate an alarm when either of the verification of the CGA and the verification of the signature of the DHCP message sender fails.

7. The computer program product of claim 5, wherein the address verifying unit is configured to verify the CGA by using a public key of the DHCP message sender and the CGA parameters.

8. The computer program product of claim 5, wherein the signature verifying unit is configured to verify the signature of the DHCP message sender by using a public key of the DHCP message sender.

9. A Dynamic Host Configuration Protocol (DHCP) message server, comprising:
   a receiver, configured to receive a DHCP message from a network client, wherein a source address of the DHCP message is a Cryptographically Generated Address (CGA) and contents of the DHCP message comprise a payload, one or more CGA parameters and a signature of the network client for the contents of the DHCP message;
   a processor, configured to verify the CGA and the signature of the network client and process the payload of the DHCP message after the verifications of the CGA and the signature succeeded,
   wherein the signature of the DHCP message sender is carried in a signature option of the DHCP message and the CGA parameters are carried in a CGA parameter option of the DHCP massage, and wherein the CGA parameters are a union of the parameters used by the network client in the process for generating the CGA.

10. A network client, comprising:

a receiver, configured to receive a Dynamic Host Configuration Protocol (DHCP) message from a DHCP message server, wherein a source address of the DHCP message is a Cryptographically Generated Address (CGA) and contents of the DHCP message comprise a payload, one or more CGA parameters and a signature of the DHCP message server for the contents of the DHCP message;

a processor, configured to verify the CGA and the signature of the DHCP message server and process the payload of the DHCP message after the verifications of the CGA and the signature succeeded, wherein the signature of the DHCP message sender is carried in a signature option of the DHCP message and the CGA parameters are carried in a CGA parameter option of the DHCP massage, and wherein the CGA parameters are a union of the parameters used by the DHCP message server in the process for generating the CGA.

* * * * *